(12) United States Patent
Mackie

(10) Patent No.: US 10,755,050 B2
(45) Date of Patent: Aug. 25, 2020

(54) SYSTEM AND METHOD FOR TEXT ANALYSIS AND ROUTING OF OUTGOING MESSAGES

(71) Applicant: Verint Americas Inc., Alpharetta, GA (US)

(72) Inventor: Scott Mackie, Glasgow (GB)

(73) Assignee: Verint Americas Inc., Alpharetta, GA (US)

(*) Notice: Subject to any disclaimer, the term of this patent is extended or adjusted under 35 U.S.C. 154(b) by 453 days.

(21) Appl. No.: 15/626,945

(22) Filed: Jun. 19, 2017

(65) Prior Publication Data

US 2018/0365221 A1 Dec. 20, 2018

(51) Int. Cl.
| | |
|---|---|
| G06F 40/30 | (2020.01) |
| H04L 12/58 | (2006.01) |
| G06F 40/166 | (2020.01) |
| G06F 40/232 | (2020.01) |
| G06F 40/253 | (2020.01) |

(52) U.S. Cl.
CPC .......... *G06F 40/30* (2020.01); *G06F 40/166* (2020.01); *G06F 40/232* (2020.01); *G06F 40/253* (2020.01); *H04L 51/12* (2013.01); *H04L 51/14* (2013.01); *H04L 51/22* (2013.01)

(58) Field of Classification Search
CPC ...... G06F 17/24; G06F 17/273; G06F 17/274; G06F 17/2785; G06F 40/166; G06F 40/232; G06F 40/253; G06F 40/30; H04L 51/22; H04L 51/12; H04L 51/14

USPC ........................................................ 709/206
See application file for complete search history.

(56) References Cited

U.S. PATENT DOCUMENTS

| | | | | |
|---|---|---|---|---|
| 8,150,679 | B2 * | 4/2012 | Wick | G06Q 10/107 704/8 |
| 2003/0088693 | A1 * | 5/2003 | Cheung | H04L 51/066 709/238 |
| 2005/0283726 | A1 * | 12/2005 | Lunati | G06F 17/273 715/257 |
| 2012/0020473 | A1 * | 1/2012 | Mart | H04L 51/14 379/265.09 |
| 2014/0297764 | A1 * | 10/2014 | Skiba | H04M 3/5175 709/206 |
| 2015/0207766 | A1 * | 7/2015 | Lindner | H04L 51/06 709/206 |
| 2017/0124303 | A1 * | 5/2017 | Baldwin | G06F 21/10 |
| 2017/0344889 | A1 * | 11/2017 | Sengupta | G06F 17/2785 |

* cited by examiner

*Primary Examiner* — Michael C Lai
(74) *Attorney, Agent, or Firm* — Christopher M. Scherer; DeWitt LLP

(57) ABSTRACT

The present invention allows text analysis and routing of an outgoing message. The system intercepts outgoing messages for analysis by a TAS software module. The module assigns an analytical score to the message, then compares the score to a threshold. If the score is below the threshold, the message is transmitted to its ultimate destination. If not, the message may be routed for correction by the message's composer or quality assurance staff. After such correction, the message new analytical score is generated and compared, and, if necessary, the process repeats again.

20 Claims, 4 Drawing Sheets

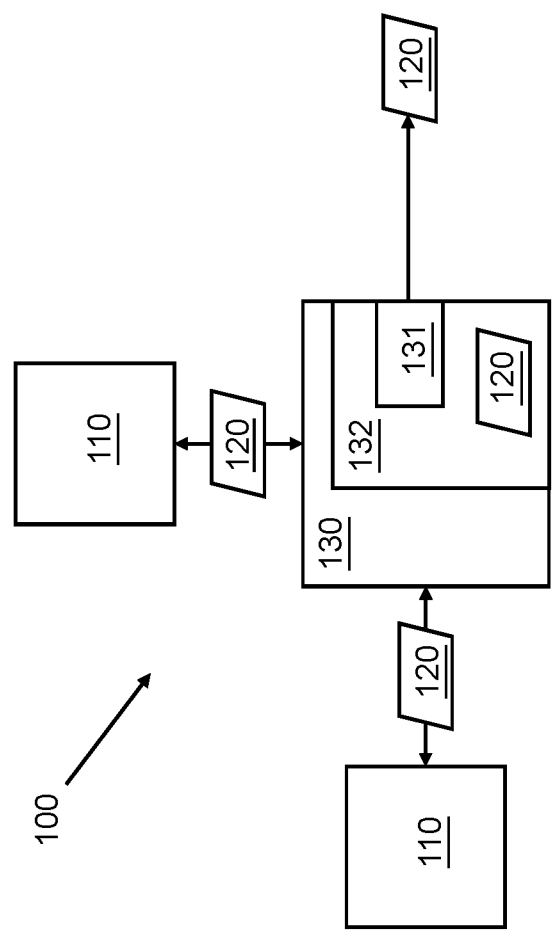

SYSTEM AND METHOD FOR TEXT ANALYSIS AND ROUTING OF OUTGOING MESSAGES

FIELD

The present disclosure is directed to a method for computer analysis, specifically a method of analyzing text in an outgoing message and routing the message based on the analysis.

BACKGROUND

One of the key challenges facing any organization engaging in customer service is the maintenance of excellent outbound communications. Every customer service request becomes a two-way conversation in which the organization must assist their customer while maintaining an appropriate corporate tone. This is further complicated by organizations' reliance upon the conversational skills of their customer service representatives (CSRs), which may vary drastically from person to person. In written communication channels such as email or social media posts this problem manifests itself in many ways, ranging from simple spelling and grammatical mistakes to incorrect formality of language for a given situation. Disaffected CSRs may even send out intentionally unacceptable communications in response to communications from customers.

Employing common tools such as spelling and grammar checkers can mitigate some of these issues, but subtler issues often require application of quality assurance (QA) processes by the organization. Such processes require dedicated staff to double check outgoing messages for errors and appropriate tone. Either the QA staff or the original sender can then rectify mistakes or make other necessary changes before the message is sent on to the customer.

Maintaining a QA process like this can be costly to an organization. Inspecting individual messages is slow, delaying communication with customers. Smaller organizations cannot afford to set aside staff to look at every outbound communication. Larger organizations may have such a high volume of messages that a dedicated staff capable of handling the workload would be a significant drain on resources. This leads to inconsistent application of communication guidelines, sometimes ending in a poor experience for the customer. With the increase in online ratings and social media postings regarding customer experiences, publicized instances of poor communication can have a detrimental effect on a business.

There is an unmet need in the art for a system capable of automatically intercepting and analyzing outgoing messages sent from a CSR and rerouting poor-quality messages for correction.

SUMMARY

An exemplary embodiment of the present application is a method for text analysis and routing of outgoing messages. The transmission of an outgoing message composed on a customer engagement center (CEC) desktop is intercepted using a TAS unit. A TAS software module performs an analysis of the outgoing message, assigning an analytical score to the outgoing message based on the analysis. After comparing the analytical score to a quality threshold, the outgoing message is transmitted to an ultimate destination.

An exemplary embodiment of the present application is a system for text analysis and routing of outgoing messages. The system includes a CEC desktop that transmits an outgoing message composed on the CEC desktop, a processor, and a non-transitory computer readable medium programmed with computer readable code that upon execution by the processor causes the processor to execute the above-mentioned method for text analysis and routing of outgoing messages.

Another exemplary embodiment of the present application is a non-transitory computer readable medium programmed with computer readable code that upon execution by a processor causes the processor to execute the above-mentioned method for text analysis and routing of outgoing messages.

The objects and advantages will appear more fully from the following detailed description made in conjunction with the accompanying drawings.

BRIEF DESCRIPTION OF THE DRAWING(S)

FIG. 1 depicts an exemplary embodiment of a customer engagement center system for text analysis and routing of outgoing messages.

DETAILED DESCRIPTION OF THE DRAWING(S)

Figure 2A:
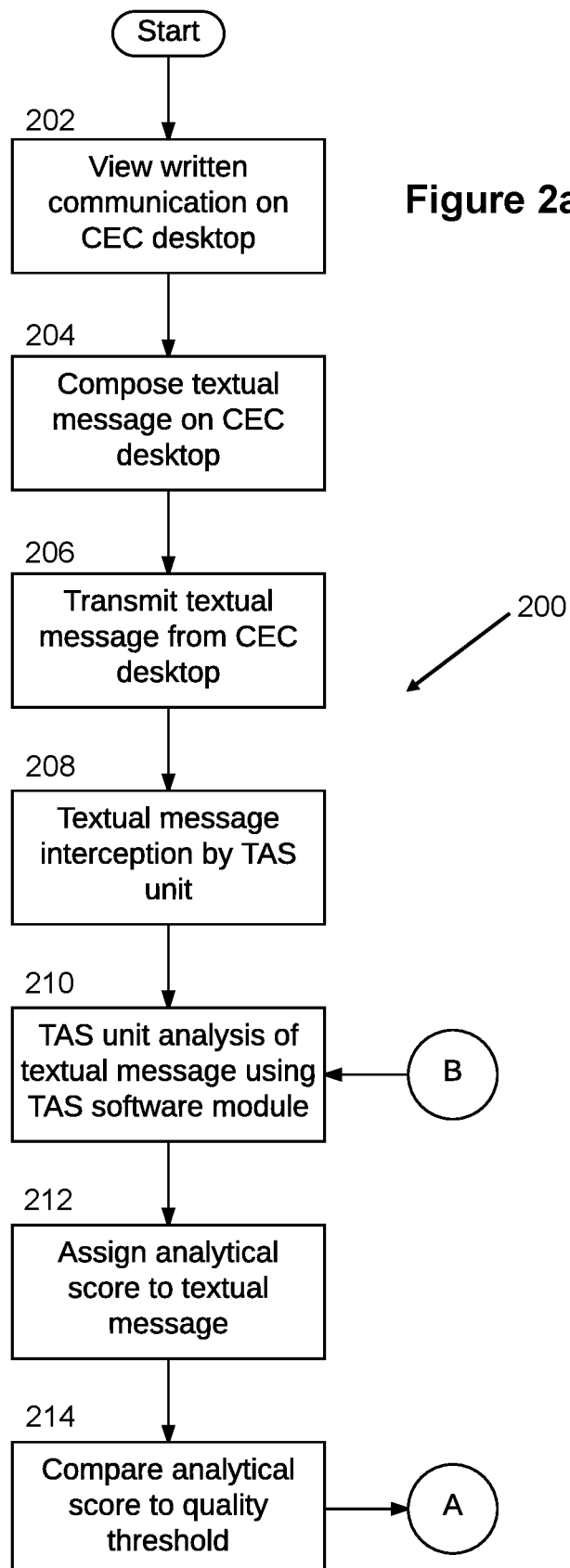
FIGS. 2a and 2b depict a flowchart of an exemplary embodiment of a method for text analysis and routing of outgoing messages.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Customer engagement center (CEC) systems allow customer service agents to engage with customers in a controlled manner. By applying automated analysis of outgoing messages, the CEC system can allow an organization to achieve several key benefits. First, every message can receive a degree of analysis before it leaves the organization's control. Second, the organization can reduce costs. The quality assurance (QA) staff will spend their time working on messages selected for further investigation by the system, rather than wasting time inspecting messages without mistakes.

In embodiments, it is desirable for the system to automatically intercept and analyze the text of an outgoing message drafted by a customer service representative (CSR). This allows the system to route the outgoing message to the CSR or to QA staff if the outgoing message has a high analytical score, indicating, for example, that it contains too many errors or too much unacceptable language. In an embodiment, it is desirable to route the outgoing message directly to the CSR for correction. In an embodiment, it is desirable to route the outgoing message directly to the QA staff if the analytical score is too high, the CSR has already attempted to correct the outgoing message, the outgoing message contains predetermined "red flag" features, or if the company wants outgoing messages to automatically route to the QA staff. In an embodiment, it is desirable to repeat the check and routing (if necessary) to ensure that old errors were corrected and no new errors introduced.

FIG. 1 depicts an exemplary embodiment of CEC system 100 for text analysis and routing of outgoing messages.

CEC system 100 includes at least one CEC desktop 110 used by a CSR for composing outgoing messages 120 and optionally reading incoming written communications. In the exemplary embodiment, at least one additional CEC desktop 110 is used by QA staff to review and if necessary correct outgoing messages 120. By way of non-limiting example, outgoing messages 120 may include a response to written communication, a scheduled or spontaneous post on a social networking or content-sharing service, a post on a review site, a press release, or any other outgoing message.

CEC system 100 also includes a text analytics service (TAS) unit 130 having a TAS software module 131 and an optional TAS storage 132. TAS unit 130 may be a processor or a combination of a processing system and a storage system. TAS unit 130 intercepts outgoing messages 120 sent from CEC desktop(s) 110 and analyzes outgoing messages 120 using TAS software module 131 to generate an analytical score. Optionally, TAS unit 130 may also permanently or temporarily save a copy of the outgoing message to internal or external TAS storage 132.

The analysis may evaluate spelling, grammar, sentiment, tone, word choice, or any other characteristic of outgoing message 120. TAS software module 131 may also identify outgoing messages 120 with predetermined red flag features, such as prohibited words, phrases, or expressions. Such red flag features, offensive sentiment, tone, or word choice, or grammatical or spelling errors in outgoing messages 120 result in an increased analytical score. Different types of characteristics or flagged features may be weighed differently. By way of non-limiting example, TAS software module 131 may score an otherwise-perfect outgoing message 120 containing an obscene word far higher than another outgoing message 120 with multiple misspelled words. By way of another non-limiting example, TAS software module 131 may score a first outgoing message 120 with a racial slur higher than a second outgoing message 120 with a misspelled word. If necessary, QA staff or another entity may update any of the analytical characteristics, scoring methodology, score weight, and flagged features at regular intervals or as-needed.

TAS software module 131 also compares the analytical score to a quality threshold. Outgoing messages 120 with analytical scores below the quality threshold are allowed to pass to their final destination. Outgoing messages 120 with analytical scores above the quality threshold require correction before passing to their final destination. Such outgoing messages 120 may return to the originating CSR or pass to QA staff. Once corrected, TAS software module 131 analyzes and compares the outgoing message again. A corrected outgoing message 120 is only allowed to pass if its analytical score has dropped below the threshold and it contains no red flag features; otherwise, outgoing message 120 returns to the originating CSR or QA staff. In embodiments where outgoing message 120 returns to the originating CSR, such as the exemplary embodiment, a CSR only has a certain number of attempts to correct their outgoing message 120 before it goes to QA staff. This ensures that CSRs with poor writing and correction skills do not overly delay communication. In certain other embodiments, the presence of a red flag feature in outgoing message 120 automatically passes outgoing message 120 to QA staff. This ensures that QA staff are aware of any uses of prohibited words, phrases, or expressions.

Quality thresholds may vary according to the type of outgoing messages 120. For example, an email message directly replying to a written communication from an important customer may have a much lower quality threshold than a general social media post to a high-volume account or a minor notice posted to the CSR's company intranet. The QA staff or another entity may update any of the quality thresholds as needed to ensure excellent communications. In the exemplary embodiment, a second threshold higher than the quality threshold, a QA threshold, automatically directs particularly high-scoring outgoing messages 120 to QA staff rather than to the originating CSR. This alerts QA staff if a CSR has extremely poor writing capability, potentially necessitating remedial training.

Figure 2B:
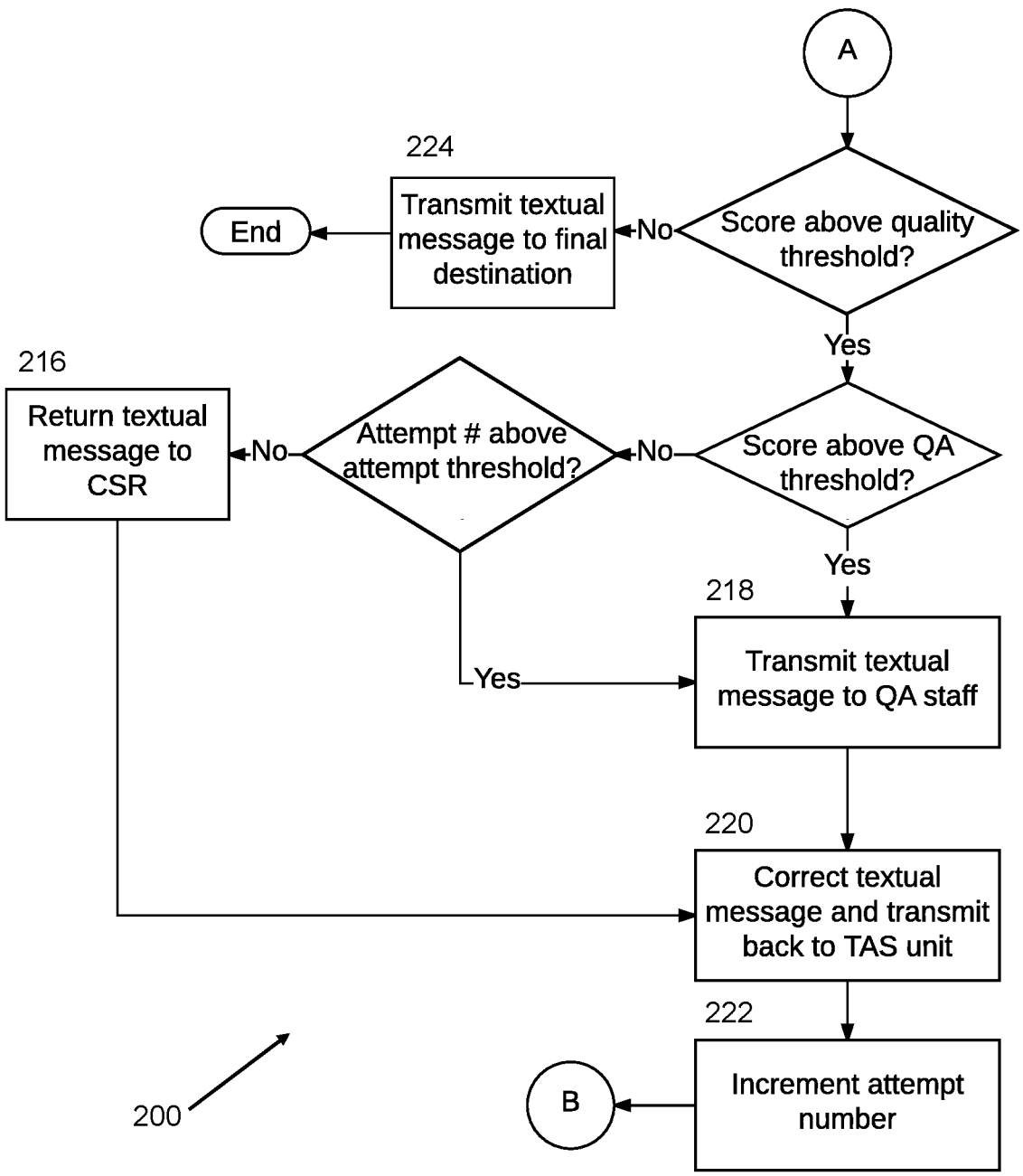

FIGS. 2a and 2b depict a flowchart of an exemplary embodiment of method 200 for text analysis and routing of outgoing messages.

In optional step 202, a CSR views a written communication on a customer engagement center (CEC) desktop of a CEC system. The written communication may be an online posting, a direct message from a customer, a communication from a third party, a message from a customer forwarded by a third party, or any other written communication.

In step 204, the CSR composes an outgoing message on the CEC desktop.

In step 206, the CSR transmits the outgoing message from the CEC desktop to the CEC system.

In step 208, the outgoing message is intercepted by a TAS unit in the CEC system.

In step 210, the TAS unit performs an analysis of the outgoing message using a TAS software module. The analysis may evaluate the message's spelling, grammar, sentiment, tone, word choice, or any other characteristic. The analysis may also review outgoing messages to detect slurs, obscenities, insults, or other predetermined red flag words, phrases, or expressions. The TAS unit may also permanently or temporarily save a copy of the outgoing message to internal or external TAS storage.

In step 212, the TAS unit assigns an analytical score to the outgoing message based on the analysis of step 210. A message with numerous misspellings, grammatical mistakes, and poor word choices will have a higher score than one without any such errors.

In step 214, the TAS unit compares the analytical score to a quality threshold. The TAS software module may be programmed with multiple different quality thresholds for different outgoing messages.

In optional step 216, the TAS unit transmits the outgoing message to the CSR if the analytical score is above the quality threshold. In the exemplary embodiment, the CSR does not receive the outgoing message if the analytical score is above a QA threshold; in such a scenario, the outgoing message is instead sent directly to QA staff. Likewise, in the exemplary embodiment, if the CSR is unable to bring the analytical score above the quality threshold after a given number of attempts (i.e., if an attempt number is above an attempt threshold), the QA staff receive the outgoing message for correction. In other embodiments, the CSR receives the outgoing message automatically. In certain other embodiments, QA staff receive the outgoing message automatically if the CSR includes red flag features in the outgoing message. The transmission may also include feedback pertaining to the quality of the outgoing message, such as, but not limited to, the analytical score, specific spelling mistakes, specific grammatical mistakes, suggested changes, at least one previous version of the outgoing message, at least one previous version of the outgoing message with highlighted changes, or information on any other message characteristic.

In optional step 218, the TAS unit transmits the outgoing message to the QA staff if the analytical score is above the quality threshold. In the exemplary embodiment, the QA staff receive the outgoing message if the analytical score is above the QA threshold or if the CSR is unable to bring the analytical score above the quality threshold after a given number of attempts. In other embodiments, the QA staff receive the outgoing message automatically. In certain other embodiments, QA staff receive the outgoing message automatically if the outgoing message includes red flag features. The transmission may also include feedback pertaining to the quality of the outgoing message, such as, but not limited to, the analytical score, specific spelling mistakes, specific grammatical mistakes, suggested changes, at least one previous version of the outgoing message, at least one previous version of the outgoing message with highlighted changes, or information on any other message characteristic.

In optional step 220, the CSR or the QA staff correct the outgoing message if the analytical score is above the quality threshold, then transmit the corrected outgoing message from the CEC desktop back to the TAS unit.

In optional step 222, method 200 repeats steps 210-220, as applicable, until the analytical score is below the quality threshold. In the exemplary embodiment, method 200 increments the attempt number with each repetition.

In step 224, the TAS unit transmits the outgoing message to its ultimate destination.

Figure 3:
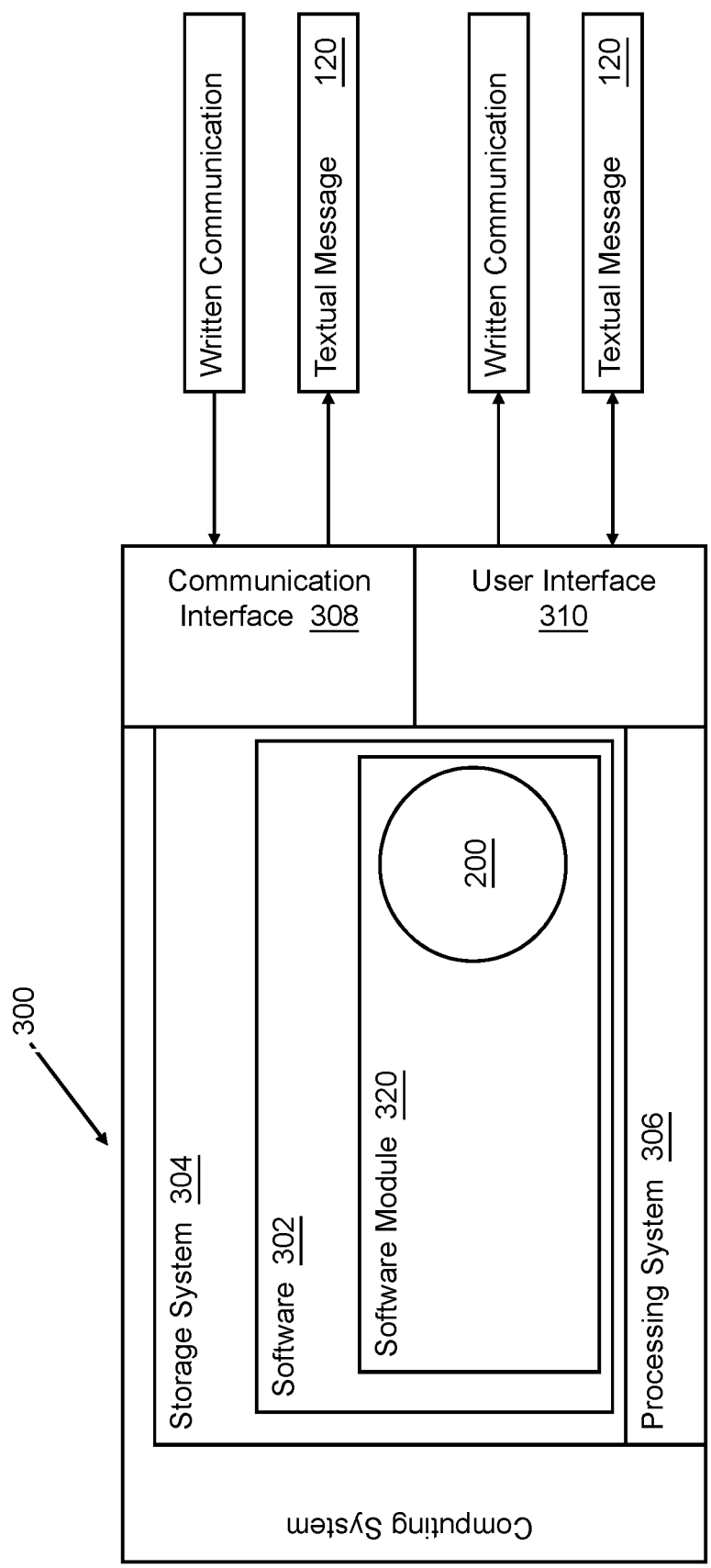
FIG. 3 depicts an exemplary embodiment of a system for text analysis and routing of outgoing messages.

FIG. 3 depicts an exemplary embodiment of system 300 for text analysis and routing of outgoing messages. System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Although computing system 300 as depicted in FIG. 3 includes one software module in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 110, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display CEC desktop 110, outgoing messages 120, written communications, or another interface further associated with embodiments of the system and method as disclosed herein. Speakers, printers, haptic devices and other types of output devices may also be included in the user interface 310. A CSR or member of QA staff can communicate with computing system 300 through the user interface 310 in order to view a written communication, create one or more outgoing messages 120, enter client input, manage an interaction, or any number of other tasks the CSR or QA staff may want to complete with computing system 300.

As described in further detail herein, computing system 300 receives and transmits data through communication interface 308. In embodiments, the communication interface 308 operates to send and/or receive data, such as, but not limited to, outgoing message 120 to/from other devices to which computing system 300 is communicatively connected, and to receive and process client input, as described in greater detail above. The client input can include written communication, details about a request, work order or other set of information that will necessitate an interaction between the client and the agent. Client input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for text analysis and routing of outgoing messages, comprising:
   initiating transmission of an outgoing message to an ultimate destination, wherein the transmission is initiated from a customer engagement center (CEC) desktop;
   intercepting the transmission of the outgoing message using a text analytics service (TAS) unit prior to transmitting the outgoing message to the ultimate destination, wherein the outgoing message is composed on the customer engagement center (CEC) desktop;
   performing an automated analysis of the outgoing message using a TAS software module to detect a plurality of errors;
   assigning an analytical score to the outgoing message based on the analysis;
   comparing the analytical score to a quality threshold; and
   transmitting the outgoing message to the ultimate destination when the analytical score is less than the quality threshold.

2. The method of claim 1, further comprising viewing a written communication by a customer service representative (CSR) on the CEC desktop before composing the outgoing message.

3. The method of claim 1, further comprising transmitting the outgoing message to a customer service representative (CSR) or to a set of quality assurance (QA) staff for correction before transmitting the outgoing message to the ultimate destination.

4. The method of claim 3, further comprising transmitting the outgoing message to the CSR if the analytical score is above the quality threshold.

5. The method of claim 3, further comprising transmitting the outgoing message to the set of QA staff if the analytical score is above the quality threshold.

6. The method of claim 3, further comprising transmitting the outgoing message to the set of QA staff if the analytical score is above a QA threshold.

7. The method of claim 3, further comprising transmitting the outgoing message to the set of QA staff if the analytical score is above the quality threshold and if an attempt number is above an attempt threshold, wherein the attempt number is a number of times the outgoing message is rerouted for quality corrections.

8. The method of claim 3, further comprising transmitting the outgoing message to the set of QA staff if the outgoing message includes at least one red flag feature.

9. The method of claim 3, further comprising transmitting feedback pertaining to the quality of the outgoing message.

10. The method of claim 9, wherein the feedback is selected from the group consisting of: analytical score, specific spelling mistakes, specific grammatical mistakes, suggested changes, at least one previous version of the outgoing message, and at least one previous version of the outgoing message with highlighted changes.

11. The method of claim 3, further comprising repeating transmitting the outgoing message to the CSR or to the set of QA staff for correction until the analytical score is below the quality threshold and the outgoing message does not include red flag features.

12. The method of claim 11, further comprising incrementing an attempt number with each repetition, wherein the attempt number is a number of times the outgoing message is rerouted for quality corrections.

13. The method of claim 1, wherein the analysis evaluates a plurality of weighted quality errors requiring corrections of a plurality of characteristics and features of the outgoing message, wherein the weight given to the outgoing message containing an obscene word is greater than an outgoing message with a plurality of spelling errors, further wherein the characteristics and features consisting of: prohibited words, prohibited phrases, and prohibited expressions, offensive sentiment, offensive tone, offensive word choice, grammatical and spelling errors.

14. The method of claim 13, wherein at least one of the plurality of weighted characteristics and features is weighed differently from another of the plurality of weighted characteristics and features.

15. A system for text analysis and routing of outgoing messages, comprising:
   a processor; and
   a non-transitory computer readable medium programmed with computer readable code that upon execution by the processor causes the processor to:
   initiate a transmission of an outgoing message to an ultimate destination, wherein the transmission is initiated from a customer engagement center (CEC) desktop;
   intercept the transmission of the outgoing message using the text analytics service (TAS) unit prior to the transmission being completed to the ultimate destination, wherein the outgoing message is composed on the customer engagement center (CEC) desktop;
   perform an automated analysis of the outgoing message using a TAS software module to detect a plurality of quality errors;
   assign an analytical score to the outgoing message based on the analysis;
   compare the analytical score to a quality threshold; and
   transmit the outgoing message to the ultimate destination when the analytical score is less than the quality threshold.

16. The system of claim 15, wherein the TAS software module is programmed to evaluate the message's spelling, grammar, sentiment, tone, word choice, or any other characteristic.

17. The system of claim 15, wherein the TAS software module is programmed to review outgoing messages to detect predetermined red flag words, phrases, or expressions.

18. The system of claim 15, wherein the TAS unit is configured to save a copy of the outgoing message to the TAS storage.

19. The system of claim 15, wherein the TAS software module is programmed with a plurality of quality thresholds, wherein each of the plurality of quality thresholds corresponds to a different type of outgoing message.

20. A non-transitory computer readable medium programmed with computer readable code that upon execution by a processor causes the processor to:
   initiate a transmission of an outgoing message to an ultimate destination, wherein the transmission is initiated from a customer engagement center (CEC) desktop
   intercept the transmission of the outgoing message using a text analytics service (TAS) unit prior to the transmission being completed to the ultimate destination, wherein the outgoing message is composed on the customer engagement center (CEC) desktop;
   perform an automated analysis of the outgoing message using a TAS software module to detect a plurality of errors;

assign an analytical score to the outgoing message based on the analysis;
compare the analytical score to a quality threshold; and
transmit the outgoing message to the ultimate destination when the analytical score is less than the quality threshold.

\* \* \* \* \*